United States Patent
Li et al.

(10) Patent No.: US 8,472,217 B2
(45) Date of Patent: Jun. 25, 2013

(54) SWITCHING MODE POWER SUPPLY WITH A MULTI-MODE CONTROLLER

(75) Inventors: En Li, Hangzhou (CN); Junming Zhang, Hangzhou (CN); Yuancheng Ren, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 693 days.

(21) Appl. No.: 12/720,396

(22) Filed: Mar. 9, 2010

(65) Prior Publication Data
US 2010/0302815 A1 Dec. 2, 2010

(30) Foreign Application Priority Data

May 27, 2009 (CN) .......................... 2009 1 0059441

(51) Int. Cl.
*H02H 7/122* (2006.01)
(52) U.S. Cl.
USPC ........................................ 363/56.1; 361/93.9
(58) Field of Classification Search
USPC ............ 363/56.1, 56.03, 21.15, 21.16, 21.17, 363/50; 361/93.9
See application file for complete search history.

(56) References Cited

U.S. PATENT DOCUMENTS

| | | | |
|---|---|---|---|
| 5,390,101 A | 2/1995 | Brown | |
| 5,991,172 A | 11/1999 | Jovanovic et al. | |
| 7,433,211 B1 | 10/2008 | Collmeyer et al. | |
| 2005/0046399 A1 | 3/2005 | Gan et al. | |
| 2008/0259654 A1* | 10/2008 | Huynh et al. | 363/21.16 |
| 2009/0147546 A1* | 6/2009 | Grande et al. | 363/21.16 |

* cited by examiner

*Primary Examiner* — Harry Behm
*Assistant Examiner* — Matthew Grubb
(74) *Attorney, Agent, or Firm* — Perkins Coie LLP

(57) ABSTRACT

A switching mode power supply with a multi-mode controller is provided. The switching mode power supply may include a transformer having a primary winding and a secondary winding to supply power to a load. A feedback circuit may be included to generate a feedback signal that varies in relation to the load on the secondary winding. The multi-mode controller may include a switching circuit, a frequency control circuit and a current limiting circuit. The switching circuit may be coupled to the primary winding to control current flow through the primary winding. The frequency control circuit may control a switching frequency of the switching circuit based on the feedback signal. The current limiting circuit may limit current flow through the primary winding by causing the switching circuit to suspend current flow through the primary winding when the current reaches a peak current limit that is set based on the feedback signal.

37 Claims, 7 Drawing Sheets

US 8,472,217 B2

SWITCHING MODE POWER SUPPLY WITH A MULTI-MODE CONTROLLER

CROSS-REFERENCE TO RELATED APPLICATIONS

This Application claims priority to and the benefit of Chinese Patent Application No. 200910059441.8, filed May 27, 2009, which is incorporated herein by reference in its entirety.

FIELD

The technology described in this patent document relates generally to switching mode power supplies.

BACKGROUND AND SUMMARY

In a typical switching mode power supply, the switching frequency is either fixed or increases as the load becomes lighter, often resulting in poor efficiency at light loads and poor average efficiency. Switching mode power supplies also typically include current controllers that limit the peak current to a fixed value, often causing acoustic noise at light loads.

In accordance with the teachings described herein, a switching mode power supply with a multi-mode controller is provided. The switching mode power supply may include a transformer having a primary winding and a secondary winding to supply power to a load. A feedback circuit may be included to generate a feedback signal that varies in relation to the load on the secondary winding. The multi-mode controller may include a switching circuit, a frequency control circuit and a current limiting circuit. The switching circuit may be coupled to the primary winding to control current flow through the primary winding. The frequency control circuit may control a switching frequency of the switching circuit based on the feedback signal. The current limiting circuit may limit current flow through the primary winding by causing the switching circuit to suspend current flow through the primary winding when the current reaches a peak current limit that is set based on the feedback signal.

A method for controlling a switching mode power supply may include the following steps: regulating an output voltage of the switching mode power supply by switching a transformer on and off at a switching frequency; generating a feedback signal that varies in relation to a load coupled to the output voltage; controlling the switching frequency based on the feedback signal; and limiting a peak current through a primary winding of the transformer based on the feedback signal.

DETAILED DESCRIPTION

Figure 1:
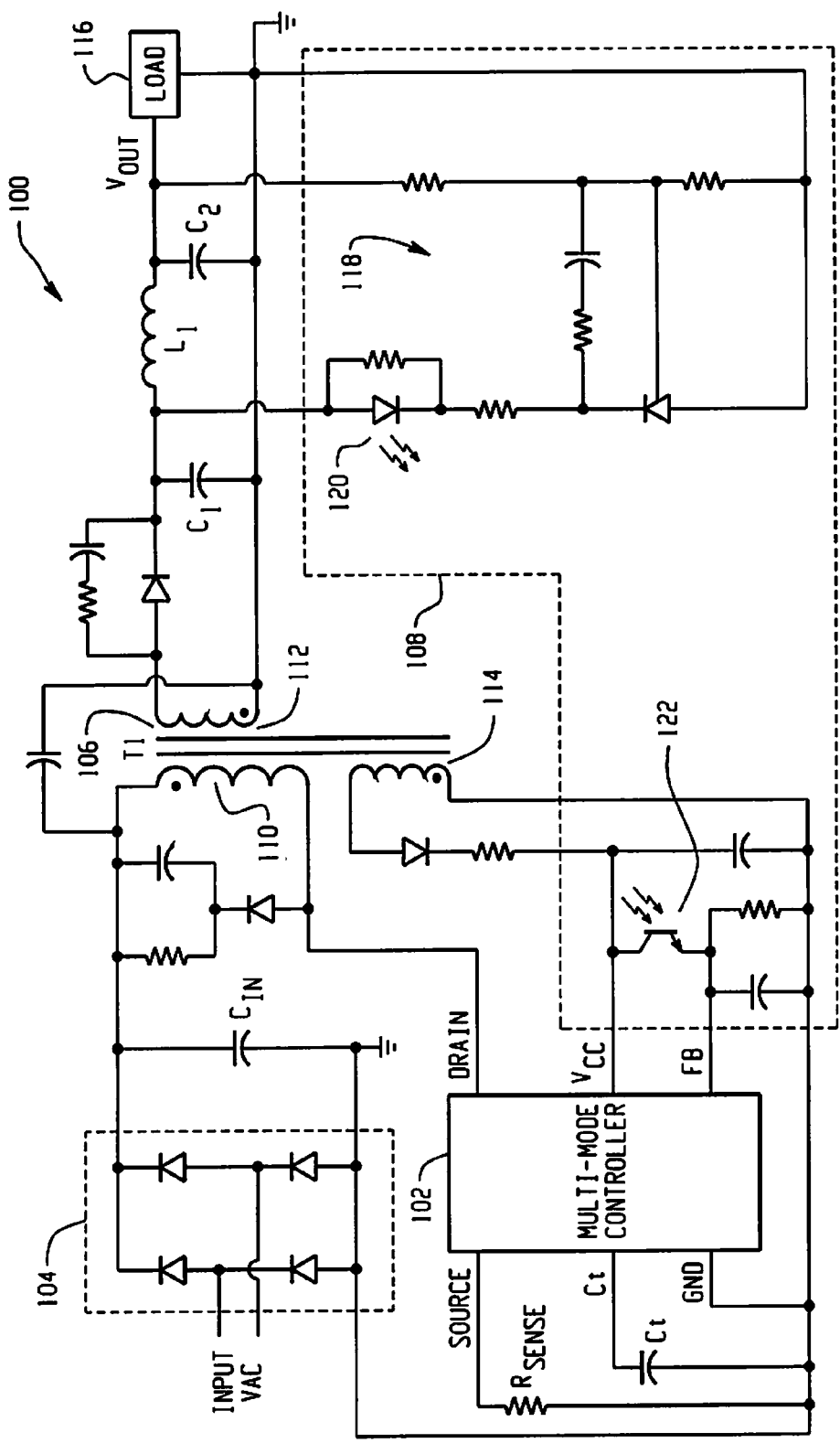
FIG. 1 is a diagram of an example switching mode power supply having a multi-mode controller.

FIG. 1 is a diagram of an example switching mode power supply 100 having a multi-mode controller 102. The switching mode power supply 100 includes a rectifier bridge 104, a transformer 106, a feedback circuit 108, and the multi-mode controller 102. The transformer 106, in this example, includes a primary winding 110, a main secondary winding 112, and an auxiliary secondary winding 114. In operation, the rectifier bridge 104 receives an AC input voltage (VAC) that it converts into a DC input voltage received by the primary winding 110 of the transformer 106. The transformer 106 is controlled by the multi-mode controller 102 to generate DC output voltages on the secondary windings 112, 114 of the transformer 106. The multi-mode controller 102 controls the current flow through the primary winding 110 of the transformer to effectively switch the transformer 106 on and off. The main secondary winding 112 supplies an output voltage ($V_{OUT}$) to the load 110 and the auxiliary secondary winding 114 provides a DC voltage source ($V_{CC}$) to the multi-mode controller 102. Also illustrated in FIG. 1 is an input capacitor ($C_{IN}$) that stores and filters the DC input voltage, an LC circuit ($L_1, C_1, C_2$) that stores and filters the DC output voltage ($V_{OUT}$), diode circuits that prevent current flow back into the secondary windings 112, 114, and a RCD snubber circuit connected across the primary winding 110.

The feedback circuit 108 generates a feedback signal (FB) that is inversely proportional to the load 110 on the main secondary winding 112 of the transformer 106. As described in more detail below, the feedback signal (FB) is used by the multi-mode controller 102 to control the switching frequency and the peak current of the transformer 106 as a function of the load. In addition, the feedback circuit 108 provides a voltage regulator that may be used to adjust the DC output voltage ($V_{OUT}$) to a desired level. More specifically, the feedback circuit 108 includes a shunt regulator 118 and an optocoupler 120, 122. The desired DC voltage output ($V_{OUT}$) may be set by varying the resistor values in the shunt regulator 118. The optocoupler includes a photodiode 120 and a phototransistor 122. In operation, the intensity of the light emitted by the photodiode 120 is inversely proportional to the load 116. As the intensity of the photodiode 120 increases, so does the conduction of the phototransistor 122, which generates the feedback signal (FB). Therefore, feedback signal (FB) is inversely proportional to the load 116, i.e., it increases as the load 116 becomes lighter and decreases as the load 116 becomes heavier. It should be understood, however, that in other examples the feedback circuit 108 and multi-mode controller 102 may be configured such that the feedback signal (FB) is proportional to the load or otherwise varies in relation to the load.

The multi-mode controller 102 includes a switching circuit that controls current flow through the primary winding 110 of the transformer 106. The power supplied to the load 116 may thus be controlled by varying the frequency at which the switching circuit switches the current through the primary winding 110 on and off. This is commonly referred to as the switching frequency of the transformer. The multi-mode controller 102 further includes a frequency control circuit that controls the switching frequency as a function of the feedback signal (FB), which is inversely proportional to the load 116 on the transformer's main secondary winding 112. In addition, the multi-mode controller 102 includes a current limiting circuit that sets a maximum peak current by causing the switching circuit to suspend current flow through the primary winding 110 when the current reaches a peak current limit that is controlled as a function of the feedback signal (FB). In this way, both the switching frequency and the maximum peak current may be regulated based on the load 116 in order to improve system performance. For instance, the multi-mode controller 102 may be configured to cause the switching frequency to decrease as the load 116 becomes lighter to provide high efficiency at lighter loads and a high average efficiency. The multi-mode controller 102 may be further configured to set the peak current limit proportionally to the load 116 to prevent mechanical resonance of the transformer 106 at lighter loads.

Figure 2:
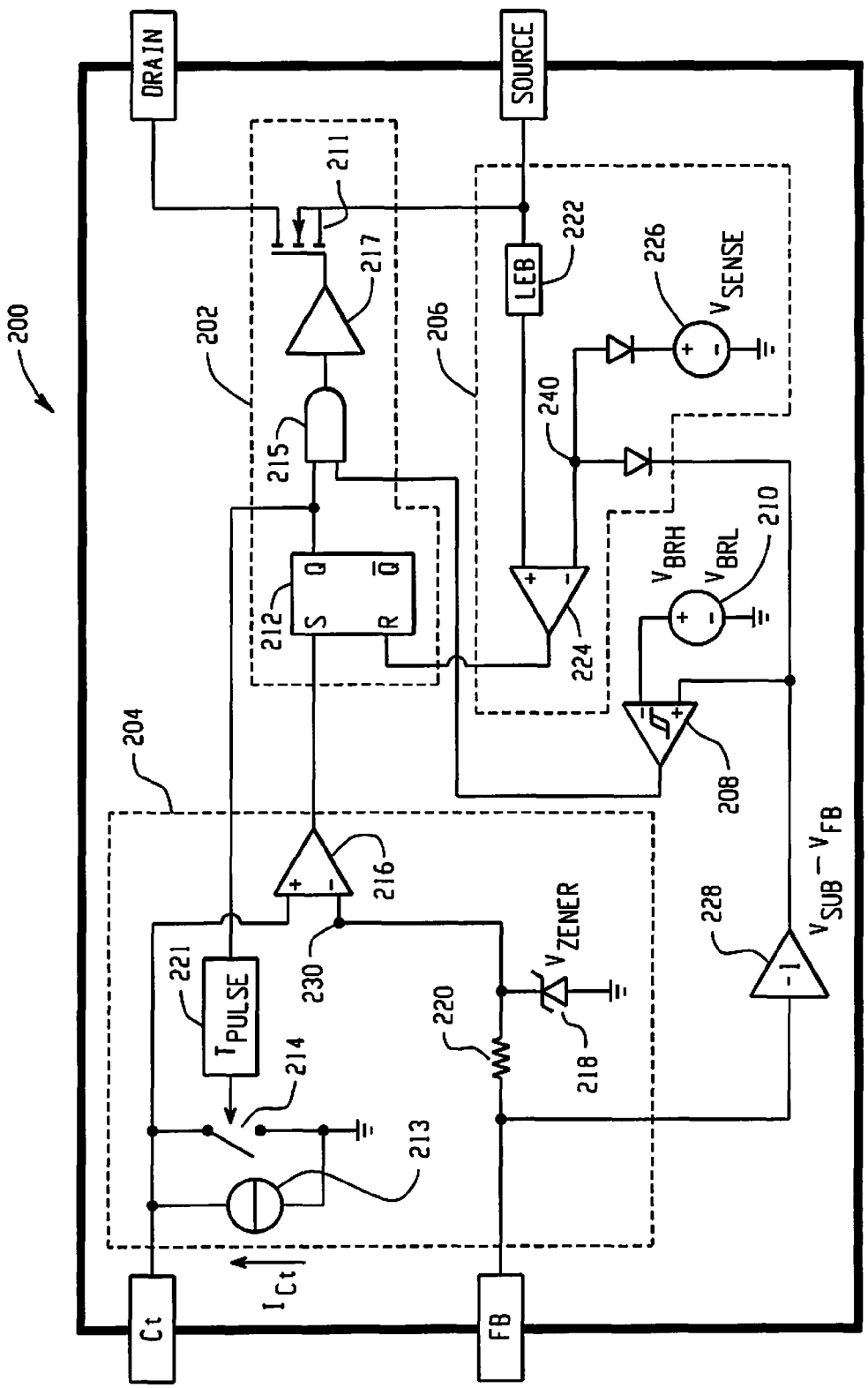
FIG. 2 is a diagram of an example multi-mode controller for a switching mode power supply.

FIG. 2 depicts an example multi-mode controller 200, which may be used in the switching mode power supply 100 of FIG. 1. The multi-mode controller 200 includes a switching circuit 202, a frequency control circuit 204, a current limiting circuit 206 and a burst mode control circuit 208, 210, 228. The switching circuit 202 includes a MOSFET switch 211, an RS flip-flop 212, a logic gate 215 and a driver 217. The frequency control circuit 204 includes a current source 213, an electronic switch 214 (e.g., a MOSFET switch), a comparator 216, a Zener diode 218, a voltage divider 220 and a delay circuit 221. The frequency control circuit 204 also includes an external capacitor (Ct) shown in FIG. 1. The current limiting circuit 206 includes a leading edge blanking (LEB) circuit 222, a comparator 224, a voltage reference ($V_{SENSE}$) 226 and a voltage subtracter 228. The current limiting circuit 206 further includes an external resistor ($R_{SENSE}$) shown in FIG. 1. The burst mode control circuit includes a Schmitt trigger comparator 208, a voltage reference 210 and a voltage subtracter 228.

In operation, the frequency control circuit 204 provides a voltage-controlled oscillator that controls the switching frequency of the MOSFET 211 based on the voltage at node 230. Specifically, when the Q output of the RS flip-flop 212 is in a logic low state, both the MOSFET switch 211 and the electronic switch 214 are open. This causes the current source 213 to charge the external capacitor (Ct), thereby increasing the voltage at the positive terminal of the comparator 216. When this voltage reaches the threshold voltage at node 230, a logic high signal is output from the comparator 216 to the S input of the flip-flop 212, causing the Q output to transition to a logic high state. When the Q output of the RS flip-flop 212 transitions to a logic high state, the MOSFET switch 211 closes for a preset time ($T_{PULSE}$), causing the external capacitor (Ct) to discharge to zero. Thus, the switching frequency of the MOSFET switch 211 may be controlled by varying the voltage at node 230. Depending on the operating mode of the controller 200, as described below with reference to FIGS. 3 and 4, the voltage at node 230 may be determined by either the feedback signal (FB) or the breakdown voltage ($V_{ZENER}$) of the Zener diode 218.

The current limiting circuit 206 controls the peak current through the primary winding by comparing the voltage at the source terminal of the multi-mode controller 200 (i.e., the voltage across the external $R_{SENSE}$ resistor) with a threshold voltage at node 240. The LEB circuit 222 is a known circuit that reduces spikes in the signal by introducing a short delay. When the voltage at the positive terminal of the comparator 224 reaches the threshold voltage at node 240, a logic high signal is output from the comparator 224 to the R input of the flip-flop 212, causing the MOSFET switch 211 to open and suspend current flow through the primary winding. Depending on the operating mode of the controller 200, as described below, the voltage at node 240 may be determined by either the feedback signal ($V_{SUB}-V_{FB}$) or the reference voltage ($V_{SENSE}$) 226.

The burst mode control circuit 208, 210, 228 causes the MOSFET switch 211 to open, suspending current flow through the primary winding, when the feedback signal (FB) indicates that the load on the transformer's main secondary winding has fallen below a predetermined minimum load threshold ($V_{BRL}$). In operation, the Schmitt trigger comparator 208 compares the output of the voltage subtracter 228 ($V_{SUB}-V_{FB}$) with a voltage reference 210. When the voltage subtracter output ($V_{SUB}-V_{FB}$) falls below the voltage reference value $V_{BRL}$ (i.e., the turn-on voltage for the Schmitt trigger comparator 208), a logic high signal is output from the comparator 208 to the logic gate 215 in the switching circuit 202, which bypasses the switching pulse (fs) and causes the MOSFET switch 211 to open. When the voltage subtracter output ($V_{SUB}-V_{FB}$) then rises above $V_{BRH}$ (i.e., the turn-off voltage for the Schmitt trigger comparator 208), the switching pulse (fs) will turn back on. This operation will continue, with the switching pulse (fs) turning on and off on a periodic basis, until the power supply is turned off or the load increases such that $V_{SUB}-V_{FB}$ remains above $V_{BRH}$.

Figure 3:
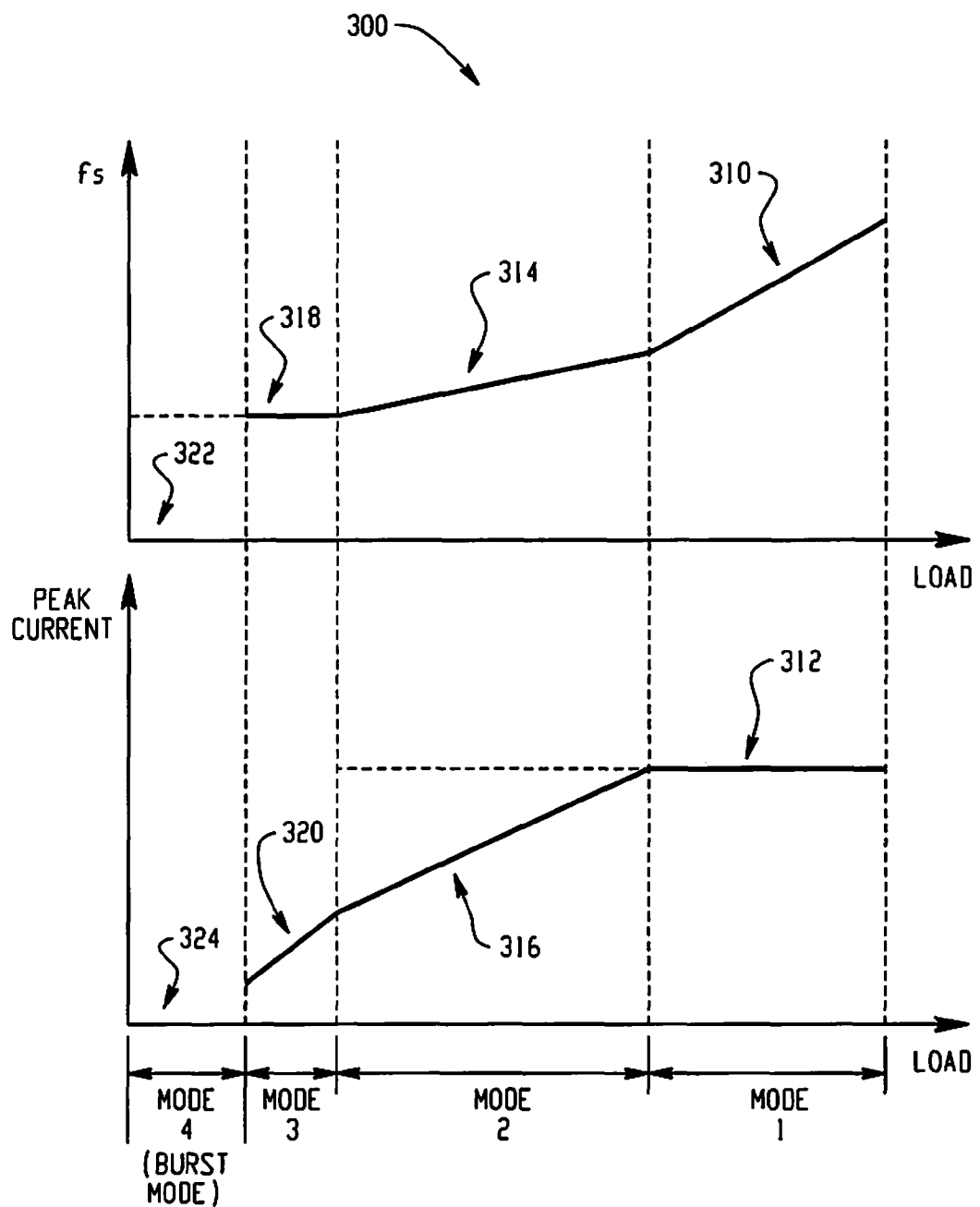
FIG. 3 is a graph illustrating an example four-mode operation of the multi-mode controller of FIG. 2.
Figure 4:
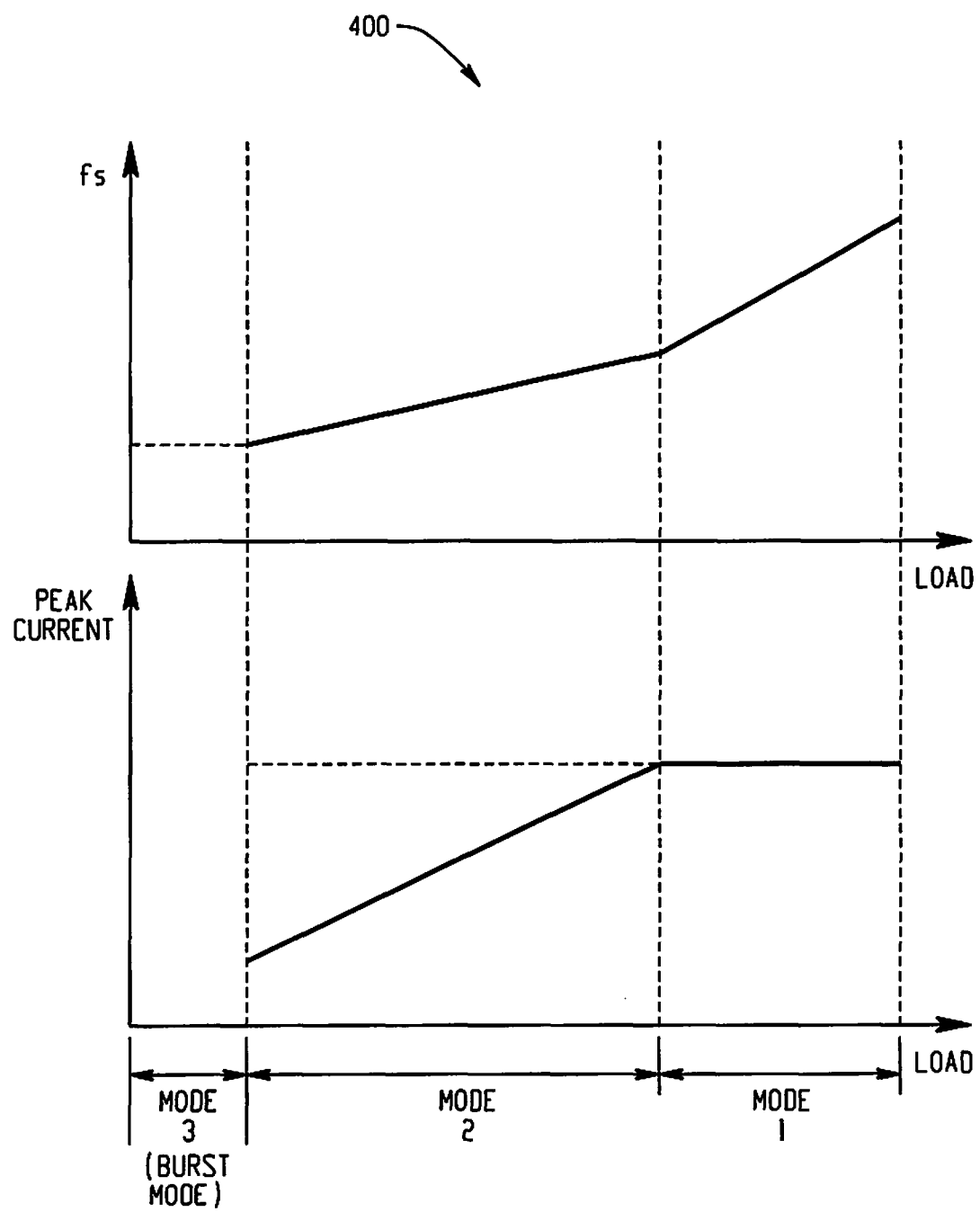
FIG. 4 is a graph illustrating an example three-mode operation of the multi-mode controller of FIG. 2.

FIGS. 3 and 4 respectively illustrate a four-mode and a three-mode operation for the multi-mode controller 200 of FIG. 2. The multi-mode controller 200 may, for example, be configured to operate as either a four-mode or a three-mode controller by selecting appropriate values for the Zener diode 218, voltage subtracter 228 and burst mode voltage reference ($V_{BR}$) 210. Specifically, the four-mode operation 300 shown in FIG. 3 may be provided by selecting design parameters for the multi-mode controller 200 such that $V_{SUB}-V_{ZENER}>V_{BRL}$, where $V_{ZENER}$ is the break-down voltage for the Zener diode 218. The three-mode operation 400 shown in FIG. 4 may be provided by selecting design parameters such that $V_{SUB}-V_{ZENER}<V_{BRL}$.

With reference first to FIG. 3, this FIG. 300 includes two graphs that respectively depict how the multi-mode controller 200 of FIG. 2 causes the switching frequency (fs) and the peak current to vary in relation to the load during four operational modes. During operational mode 1, which is used for the heaviest loads, the switching frequency varies as a function of the load and the peak current remains constant. With reference to FIG. 2, during operational mode 1 the feedback signal voltage ($V_{FB}$), which is inversely proportional to the load, is less than the Zener diode 218 breakdown voltage (i.e., $V_{FB}<V_{ZENER}$). Thus, during mode 1, the voltage at node 230 in the frequency control circuit 204 of FIG. 2 is determined by the feedback signal (FB), and the switching frequency (fs) varies in relation to the load as shown at reference 310 in FIG. 3. Also during mode 1, the output of the voltage subtracter 228 is greater than the reference voltage ($V_{SENSE}$) in the current limiting circuit 206 of FIG. 2 (i.e., $V_{SUB}-V_{FB}>V_{SENSE}$). Therefore, during mode 1, the voltage at node 240 is determined by the reference voltage ($V_{SENSE}$), and the peak current remains constant as shown at reference 312 in FIG. 3. Specifically, during mode 1 the switching frequency may be expressed as: $fs=1/[(Ct*V_{FB}/I_{Ct})+T_{PULSE}]$.

During operational mode 2, as shown in FIG. 3, both the switching frequency and the peak current vary as a function of the load. With reference to FIG. 2, during operational mode 2 the feedback signal voltage ($V_{FB}$) remains less than the Zener diode 218 breakdown voltage (i.e., $V_{FB}<V_{ZENER}$), and thus the switching frequency (fs) varies in relation to the load as shown at reference 314 in FIG. 3. Specifically, during operational mode 2 the switching frequency may be expressed as: $fs=1/[(Ct*V_{FB}/I_{Ct})+T_{PULSE}]$. Also during operational mode 2, the output of the voltage subtracter 228 ($V_{SUB}-V_{FB}$) falls below the reference voltage ($V_{SENSE}$) in the current limiting circuit 206 (i.e., $V_{SUB}-V_{FB}<V_{SENSE}$). Therefore, during operational mode 2, the voltage at node 240 is a function of the feedback signal ($V_{SUB}-V_{FB}$), and the peak current varies in relation to the load as shown at reference 316 in FIG. 3.

During operational mode 3, as shown in FIG. 3, the peak current varies as a function of the load and the switching frequency (fs) remains constant. With reference to FIG. 2, during operational mode 3 the feedback signal voltage ($V_{FB}$) becomes greater than the breakdown voltage of the Zener diode 218 (i.e., $V_{FB}>V_{ZENER}$), and thus the Zener diode 218 clamps the voltage at node 230 at its breakdown voltage ($V_{ZENER}$). This causes the switching frequency (fs) to remain constant as shown at reference 318 in FIG. 3. Specifically, during mode 3 the switching frequency may be expressed as: $fs=1/[(Ct*V_{ZENER}/I_{Ct})+T_{PULSE}]$. Also during operational mode 3, the output of the voltage subtracter 228 ($V_{SUB}-V_{FB}$) remains less than the reference voltage ($V_{SENSE}$) (i.e., $V_{SUB}-V_{FB}<V_{SENSE}$). Therefore, the peak current varies in relation to the load as shown at reference 320 in FIG. 3.

When the load falls below a minimum load threshold, the multi-mode controller enters burst mode, which is shown as operational mode 4 in FIG. 3. With reference to FIG. 2, during operational mode 4 (i.e., burst mode) the output of the voltage subtracter 228 ($V_{SUB}-V_{FB}$) falls below $V_{BRL}$ (i.e., $V_{SUB}-V_{FB}<V_{BRL}$). This causes the MOSFET switch 211 in FIG. 2 to open, resulting in no switching pulse (fs) or current flow through the primary winding as shown at references 322 and 324 in FIG. 3. When the voltage subtracter output ($V_{SUB}-V_{FB}$) rises above $V_{BRH}$, the switching pulse (fs) will turn back on.

With reference now to FIG. 4, this FIG. 400 includes two graphs that respectively depict how the multi-mode controller 200 of FIG. 2 causes the switching frequency (fs) and the peak current to vary in relation to the load during three operational modes. The three-mode operation illustrated in FIG. 4 is similar to the four-mode operation described above with reference to FIG. 3, except that as the load decreases, the multi-mode controller 102 transitions directly from mode 2 to burst mode. As explained above, the three-mode operation of the multi-mode controller 200 illustrated in FIG. 4 may be achieved by selecting design parameters such that $V_{SUB}-V_{ZENER}<V_{BRL}$.

Figure 5:
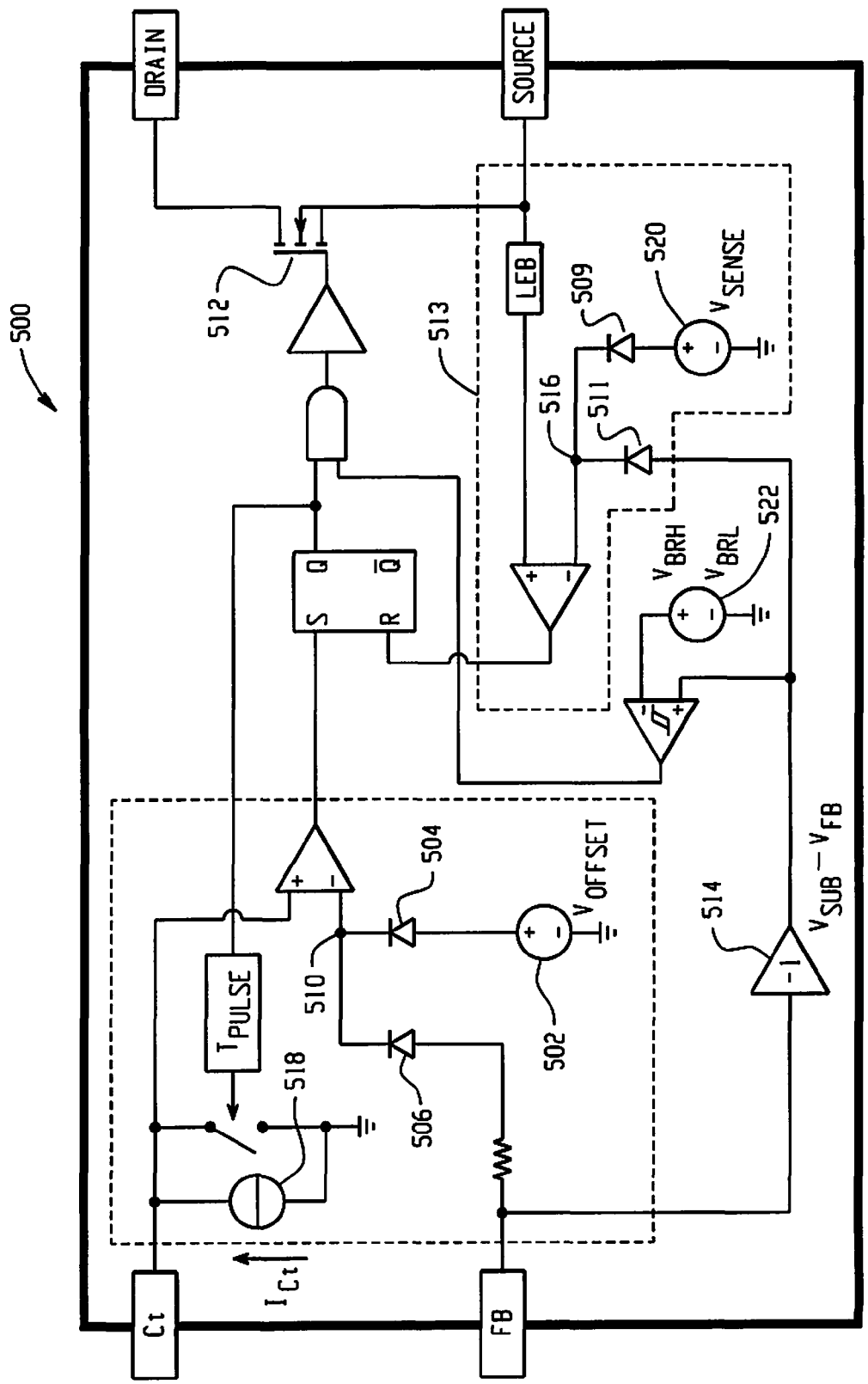
FIG. 5 is a diagram of another example multi-mode controller for a switching mode power supply.

FIG. 5 is a diagram of another example multi-mode controller 500, which may be used in the switching mode power supply 100 of FIG. 1. This example is similar to the multi-mode controller 200 described above with reference to FIG. 2, except that the Zener diode is replaced with a voltage reference ($V_{OFFSET}$) 502 and a signal choice circuit (represented in the diagram by two diodes 504, 506) to modify the operation of the frequency control circuit 508. In addition, the direction of the signal choice circuit 509, 511 is reversed to modify the operation of the current limiting circuit 513. Specifically, in this example 500 the threshold voltage at node 510, which controls the switching frequency of the MOSFET switch 512, is determined by either the feedback signal (FB) or the voltage reference ($V_{OFFSET}$) 502, depending on the operating mode of the controller 500. That is, the signal choice circuit 504, 506 causes the voltage at node 510 to be the larger of the voltage reference ($V_{OFFSET}$) 502 or the feedback signal voltage ($V_{FB}$). Also, the threshold voltage at node 516, which controls the peak current limit, is determined by the larger of the feedback signal ($V_{SUB}-V_{FB}$) or the voltage reference ($V_{SENSE}$) 520.

Figure 6:
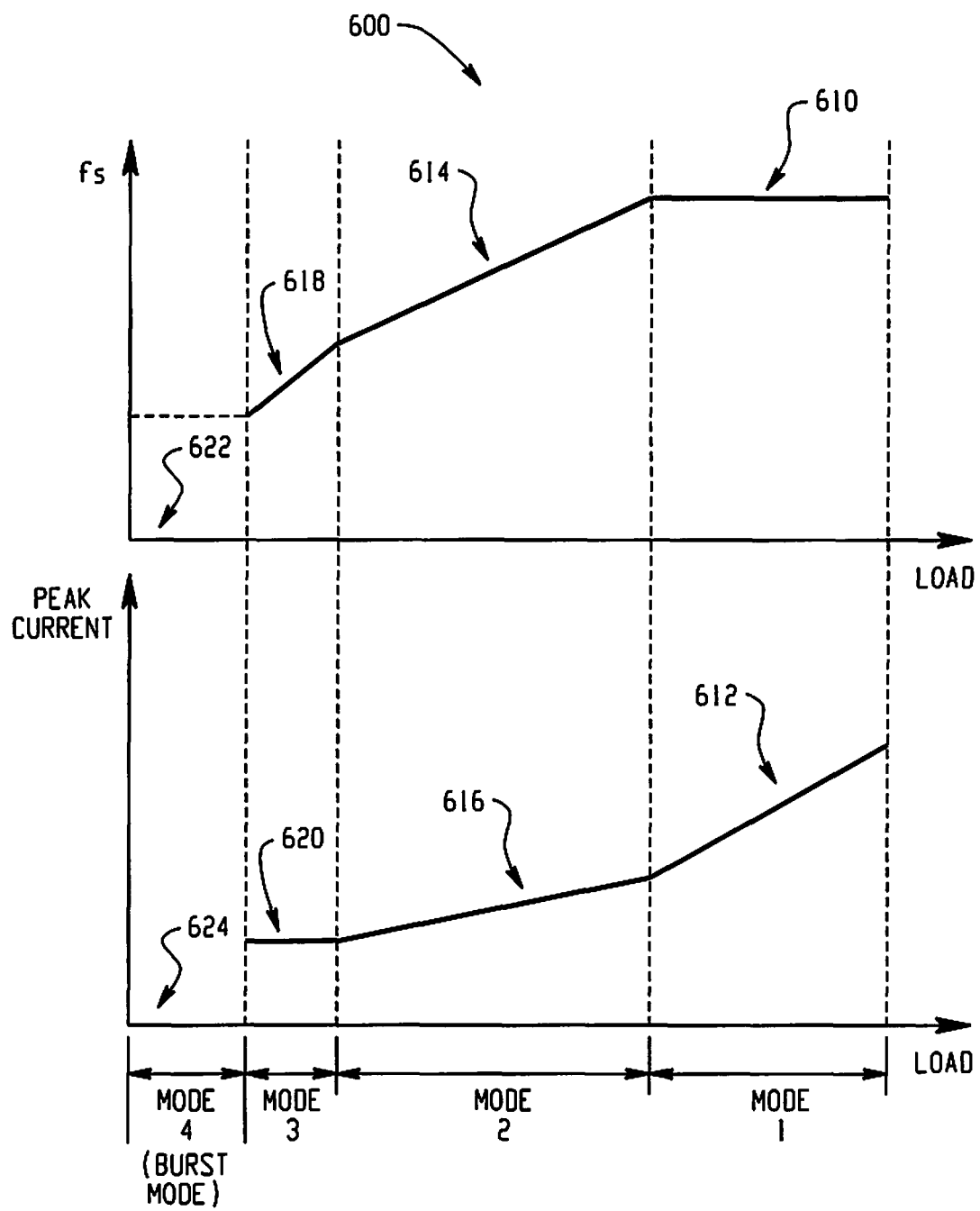
FIG. 6 is a graph illustrating an example four-mode operation of the multi-mode controller of FIG. 5.
Figure 7:
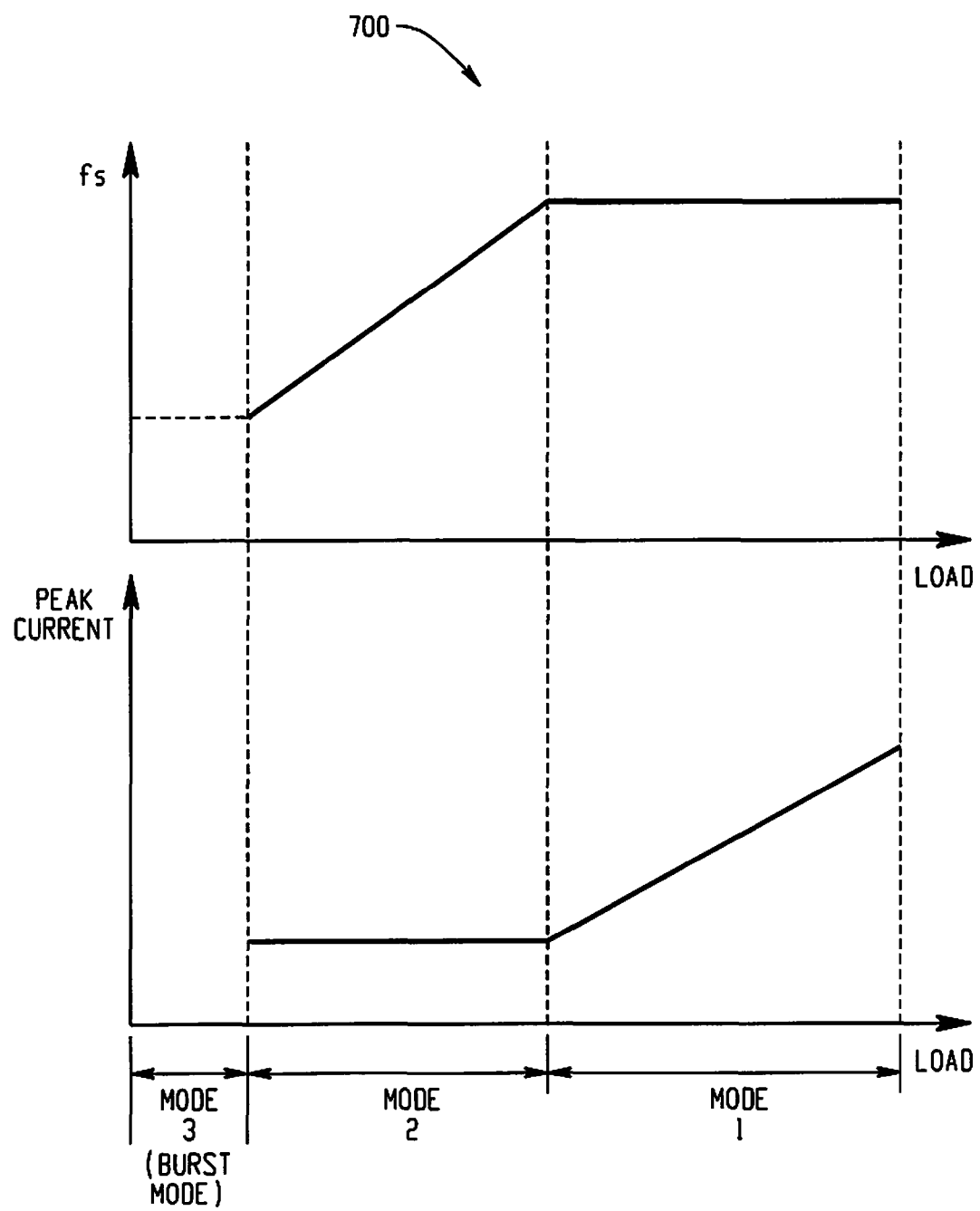
FIG. 7 is a graph illustrating an example three-mode operation of the multi-mode controller of FIG. 5.

FIGS. 6 and 7 respectively illustrate a four-mode and a three-mode operation for the multi-mode controller 500 of FIG. 5. The multimode controller 500 may, for example, be configured to operate as either a four-more or a three-mode controller by selecting appropriate values for the voltage reference ($V_{OFFSET}$) 502, voltage subtracter 514 and voltage reference ($V_{SENSE}$) 520. Specifically, the three-mode operation 700 shown in FIG. 7 may be provide by selecting design parameters such that $V_{SUB}-V_{OFFSET}=V_{SENSE}$. The four-mode operation 600 shown in FIG. 6 may be provided by selecting design parameters such that $V_{SUB}-V_{OFFSET}>V_{SENSE}$ With reference first to FIG. 6, this FIG. 600 includes two graphs that respectively depict how the multi-mode controller 500 of FIG. 5 causes the switching frequency (fs) and peak current to vary in relation to the load during four operational modes. During operational mode 1, which is used for the heaviest loads, the peak current varies as a function of the load and the switching frequency remains constant. With reference to FIG. 2, during operational mode 1 the voltage of the feedback signal ($V_{FB}$), which is inversely proportional to the load, is less than the voltage reference ($V_{OFFSET}$). Thus, during mode 1, the voltage at node 510 is clamped at a constant value by the voltage reference ($V_{OFFSET}$) and the switching frequency (fs) remains constant as shown at reference 610 in FIG. 6. Specifically, during mode 1 the switching frequency may be expressed as: $fs=1/[(Ct*V_{OFFSET}/I_{Ct})+T_{PULSE}]$. Also during operational mode 1, the output of the voltage subtracter ($V_{SUB}-V_{FB}$) 514 is greater than the reference voltage ($V_{SENSE}$) 520 (i.e., $V_{SUB}-V_{FB}>V_{SENSE}$). Therefore, during mode 1, the voltage at node 516 in the current limiting circuit is a function of the feedback signal ($V_{SUB}-V_{FB}$), and the peak current varies in relation to the load as shown at reference 612 in FIG. 6.

During operational mode 2, as shown in FIG. 6, both the switching frequency (fs) and the peak current vary as a function of the load. With reference to FIG. 5, during operational mode 2 the voltage of the feedback signal ($V_{FB}$) rises above the voltage reference ($V_{OFFSET}$), and thus the voltage at node 510 is determined by the feedback signal (FB), causing the switching frequency (fs) to vary in relation to the load as shown at reference 614 in FIG. 6. Specifically, during operational mode 2 the switching frequency (fs) may be expressed as: $fs=1/[(Ct*V_{OFFSET}/I_{Ct})+T_{PULSE}]$. Also during mode 2, the output of the voltage subtracter 514 ($V_{SUB}-V_{FB}$) remains greater than the reference voltage ($V_{SENSE}$) 520, and thus the peak current continues to vary in relation to the load as shown at reference 616 in FIG. 6.

During operational mode 3, as shown in FIG. 6, the switching frequency (fs) varies as a function of the load and the peak current is constant. With reference to FIG. 5, during operational mode 3 the voltage of the feedback signal ($V_{FB}$) remains above the voltage reference ($V_{OFFSET}$), and thus the switching frequency (fs) continues to vary in relation to the load as shown at reference 618 in FIG. 6. Also during operational mode 3, the output of the voltage subtracter ($V_{SUB}-V_{FB}$) 514 falls below the voltage reference ($V_{SENSE}$) 520, and thus the peak current is clamped at a constant value by the voltage reference ($V_{SENSE}$) 520 as shown at reference 620 in FIG. 6.

When the load falls below a minimum load threshold, the multi-mode controller enters burst mode, which is shown as operational mode 4 in FIG. 6. With reference to FIG. 5, during operational mode 4 (i.e., burst mode) the output of the voltage subtracter 514 falls below the voltage reference value $V_{BRL}$ 522 (i.e., $V_{SUB}-V_{FB}<V_{BRL}$). This causes the MOSFET switch 512 to open, resulting in no switching pulse (fs) or current through the primary winding as shown at references 622 and 624 in FIG. 6. When the voltage subtracter output ($V_{SUB}-V_{FB}$) rises above $V_{BRH}$, the switching pulse (fs) will turn back on.

With reference now to FIG. 7, this FIG. 700 includes two graphs that respectively depict how the multi-mode controller 500 of FIG. 5 causes the switching frequency (fs) and the peak current to vary in relation to the load during three operational modes. The three-mode operation illustrated in FIG. 7 is the similar to the four-mode operation described above with reference to FIG. 6, without a mode during which both the switching frequency (fs) and the peak current are simultaneously varying as a function of the load. In other words, operational mode 2 of FIG. 6 is not provided in the three-mode operation shown in FIG. 7. As explained above, the three-mode operation of the multi-mode controller 500, as illustrated in FIG. 7, may be implemented by selecting design parameters such that $V_{SUB}-V_{OFFSET}=V_{SENSE}$.

This written description uses examples to disclose the invention, including the best mode, and also to enable a person skilled in the art to make and use the invention. The patentable scope of the invention may include other examples that occur to those skilled in the art.

It is claimed:

1. A switching mode power supply, comprising:
    a transformer having a primary winding and a secondary winding to supply power to a load;
    a feedback circuit that generates a feedback signal that varies in relation to the load on the secondary winding;
    a switching circuit coupled to the primary winding to control current flow through the primary winding;
    a frequency control circuit that controls a switching frequency of the switching circuit based on the feedback signal;
    a current limiting circuit that limits current flow through the primary winding by causing the switching circuit to suspend current flow through the primary winding when the current reaches a peak current limit that is set based on the feedback signal;
    a burst mode control circuit that bypasses the frequency control circuit and the current limiting circuit to control operation of the switching circuit when the load on the secondary winding falls below a minimum load threshold; and
    wherein the switching mode power supply operates in three modes:
    a first mode during which the switching frequency varies as a function of the feedback signal and the peak current limit is constant;
    a second mode during which both the switching frequency and the peak current limit vary as a function of the feedback signal; and
    a burst mode during which operation of the frequency control circuit and the current limiting circuit is suspended.

2. The switching mode power supply of claim 1, wherein the switching mode power supply transitions from the first mode to the second mode to the burst mode as the load on the secondary winding decreases.

3. The switching mode power supply of claim 1, wherein the switching mode power supply further operates in an additional third mode during which the peak current limit varies as a function of the feedback signal and the switching frequency is constant.

4. The switching mode power supply of claim 3, wherein the switching mode power supply transitions from the first mode to the second mode to the third mode to the burst mode as the load on the secondary winding decreases.

5. The switching mode power supply of claim 3, wherein the switching mode power supply transitions from the third mode to the second mode to the first mode to the burst mode as the load on the secondary winding decreases.

6. The switching mode power supply of claim 1, wherein the frequency control circuit includes a voltage-controlled oscillator circuit that controls the switching frequency of the switching circuit as a function of a threshold voltage.

7. The switching mode power supply of claim 6, wherein the threshold voltage is determined by the feedback signal during at least one operational mode of the switching mode power supply, and wherein the threshold voltage held constant during at least one other operational mode of the switching mode power supply.

8. The switching mode power supply of claim 7, wherein the threshold voltage is held constant by a Zener diode circuit.

9. The switching mode power supply of claim 7, wherein the threshold voltage is held constant by a voltage source.

10. The switching mode power supply of claim 1, wherein the current limiting circuit includes a comparison circuit that controls the peak current limit as a function of a threshold voltage.

11. The switching mode power supply of claim 10, wherein the threshold voltage is determined based on the feedback signal during at least one operational mode of the switching mode power supply, and wherein the threshold voltage held constant during at least one other operational mode of the switching mode power supply.

12. The switching mode power supply of claim 11, wherein the threshold voltage is held constant by a voltage source.

13. The switching mode power supply of claim 1, wherein the burst mode control circuit includes a comparison circuit that suspends current flow through the secondary winding based on the feedback signal.

14. A switching mode power supply, comprising:
    a transformer having a primary winding and a secondary winding to supply power to a load;
    a feedback circuit that generates a feedback signal that varies in relation to the load on the secondary winding;
    a switching circuit coupled to the primary winding to control current flow through the primary winding;
    a frequency control circuit that controls a switching frequency of the switching circuit based on the feedback signal;
    a current limiting circuit that limits current flow through the primary winding by causing the switching circuit to suspend current flow through the primary winding when the current reaches a peak current limit that is set based on the feedback signal;
    a burst mode control circuit that bypasses the frequency control circuit and the current limiting circuit to control operation of the switching circuit when the load on the secondary winding falls below a minimum load threshold; and
    wherein the switching mode power supply operates in three modes:
    a first mode during which the peak current limit varies as a function of the feedback signal and the switching frequency is constant;
    a second mode during which the switching frequency varies as a function of the feedback signal and the peak current limit is constant; and
    a burst mode during which operation of the frequency control circuit and the current limiting circuit is suspended.

15. The switching mode power supply of claim 14, wherein the switching mode power supply transitions from the first mode to the second mode to the burst mode as the load on the secondary winding decreases.

16. A method for controlling a switching mode power supply, comprising:
regulating an output voltage of the switching mode power supply by switching a transformer on and off at a switching frequency;
generating a feedback signal that varies in relation to a load coupled to the output voltage;
controlling the switching frequency based on the feedback signal; and
limiting a peak current through a primary winding of the transformer based on the feedback signal; and
wherein the switching mode power supply operates in three modes:
a first mode during which the switching frequency varies as a function of the feedback signal and the peak current limit is constant;
a second mode during which both the switching frequency and the peak current limit vary as a function of the feedback signal; and
a burst mode during which the switching frequency and the peak current are suspended.

17. The method of claim 16, wherein the switching mode power supply transitions from the first mode to the second mode to the burst mode as the load decreases.

18. The method of claim 16, wherein the switching mode power supply further operates in an additional third mode during which the peak current limit varies as a function of the feedback signal and the switching frequency is constant.

19. The method of claim 18, wherein the switching mode power supply transitions from the first mode to the second mode to the third mode to the burst mode as the load decreases.

20. The method of claim 18, wherein the switching mode power supply transitions from the third mode to the second mode to the first mode to the burst mode as the load decreases.

21. A method for controlling a switching mode power supply, comprising:
regulating an output voltage of the switching mode power supply by switching a transformer on and off at a switching frequency;
generating a feedback signal that varies in relation to a load coupled to the output voltage;
controlling the switching frequency based on the feedback signal; and
limiting a peak current through a primary winding of the transformer based on the feedback signal; and
wherein the switching mode power supply operates in three modes:
a first mode during which the peak current limit varies as a function of the feedback signal and the switching frequency is constant;
a second mode during which the switching frequency varies as a function of the feedback signal and the peak current limit is constant; and
a burst mode during which the switching frequency and the peak current limit are suspended.

22. The method of claim 21, wherein the switching mode power supply transitions from the first mode to the second mode to the burst mode as the load decreases.

23. A multi-mode controller for a switching mode power supply that includes a transformer having a primary winding and a secondary winding to supply power to a load and a feedback circuit that generates a feedback signal that varies in relation to the load on the secondary winding, the multi-mode controller comprising:
a switching circuit to be coupled to the primary winding to control current flow through the primary winding;
a frequency control circuit to control a switching frequency of the switching circuit based on the feedback signal;
a current limiting circuit to limit current flow through the primary winding by causing the switching circuit to suspend current flow through the primary winding when the current reaches a peak current limit that is set based on the feedback signal;
a burst mode control circuit that bypasses the frequency control circuit and the current limiting circuit to control operation of the switching circuit when the load on the secondary winding falls below a minimum load threshold; and
wherein multi-mode controller operates in three modes:
a first mode during which the switching frequency varies as a function of the feedback signal and the peak current limit is constant;
a second mode during which both the switching frequency and the peak current limit vary as a function of the feedback signal; and
a burst mode during which operation of the frequency control circuit and the current limiting circuit is suspended.

24. The multi-mode controller of claim 23, wherein the multi-mode controller transitions from the first mode to the second mode to the burst mode as the load on the secondary winding decreases.

25. The multi-mode controller of claim 23, wherein the multi-mode controller further operates in an additional third mode during which the peak current limit varies as a function of the feedback signal and the switching frequency is constant.

26. The multi-mode controller of claim 25, wherein the multi-mode controller transitions from the first mode to the second mode to the third mode to the burst mode as the load on the secondary winding decreases.

27. The multi-mode controller of claim 25, wherein the multi-mode controller transitions from the third mode to the second mode to the first mode to the burst mode as the load on the secondary winding decreases.

28. The multi-mode controller of claim 23, wherein the frequency control circuit includes a voltage-controlled oscillator circuit that controls the switching frequency of the switching circuit as a function of a threshold voltage.

29. The multi-mode controller of claim 28, wherein the threshold voltage is determined by the feedback signal during at least one operational mode of the multi-mode controller, and wherein the threshold voltage held constant during at least one other operational mode of the multi-mode controller.

30. The multi-mode controller of claim 29, wherein the threshold voltage is held constant by a Zener diode circuit.

31. The multi-mode controller of claim 29, wherein the threshold voltage is held constant by a voltage source.

32. The multi-mode controller of claim 23, wherein the current limiting circuit includes a comparison circuit that controls the peak current limit as a function of a threshold voltage.

33. The multi-mode controller of claim 32, wherein the threshold voltage is determined based on the feedback signal during at least one operational mode of multi-mode controller, and wherein the threshold voltage held constant during at least one other operational mode of the multi-mode controller.

34. The multi-mode controller of claim 33, wherein the threshold voltage is held constant by a voltage source.

35. The multi-mode controller of claim 23, wherein the burst mode control circuit includes a comparison circuit that suspends current flow through the secondary winding based on the feedback signal.

36. A multi-mode controller for a switching mode power supply that includes a transformer having a primary winding and a secondary winding to supply power to a load and a feedback circuit that generates a feedback signal that varies in relation to the load on the secondary winding, the multi-mode controller comprising:

a switching circuit to be coupled to the primary winding to control current flow through the primary winding;

a frequency control circuit to control a switching frequency of the switching circuit based on the feedback signal;

a current limiting circuit to limit current flow through the primary winding by causing the switching circuit to suspend current flow through the primary winding when the current reaches a peak current limit that is set based on the feedback signal;

a burst mode control circuit that bypasses the frequency control circuit and the current limiting circuit to control operation of the switching circuit when the load on the secondary winding falls below a minimum load threshold; and wherein the multi-mode controller operates in three modes:
a first mode during which the peak current limit varies as a function of the feedback signal and the switching frequency is constant;
a second mode during which the switching frequency varies as a function of the feedback signal and the peak current limit is constant; and
a burst mode during which operation of the frequency control circuit and the current limiting circuit is suspended.

37. The multi-mode controller of claim 36, wherein the multi-mode controller transitions from the first mode to the second mode to the burst mode as the load on the secondary winding decreases.

* * * * *